United States Patent [19]
Zahn et al.

[11] Patent Number: 5,253,011
[45] Date of Patent: Oct. 12, 1993

[54] COPYING METHOD AND COPIER FOR FILM

[75] Inventors: Wolfgang Zahn; Wilhelm Nitsch, both of Munich; Günther Schnall, Eching; Gerhard Benker, Pullach, all of Fed. Rep. of Germany

[73] Assignee: AGFA-Gevaert Aktiengesellschaft, Leverkusen, Fed. Rep. of Germany

[21] Appl. No.: 834,693

[22] Filed: Feb. 11, 1992

[30] Foreign Application Priority Data

Mar. 18, 1991 [DE] Fed. Rep. of Germany ....... 4108815

[51] Int. Cl.⁵ .............................................. G03B 27/52
[52] U.S. Cl. ...................................... 355/41; 355/32; 355/35; 355/38
[58] Field of Search .......................... 355/32, 35, 38, 41

[56] References Cited

U.S. PATENT DOCUMENTS 4,176,944 12/1979 Payrhammer ........................ 355/41
4,589,766 5/1986 Fursich et al. ........................ 355/38
5,128,519 7/1992 Tokuda .................................. 355/41

FOREIGN PATENT DOCUMENTS 0320880 6/1989 European Pat. Off. .
1185472 1/1965 Fed. Rep. of Germany .
2705097 5/1981 Fed. Rep. of Germany .

*Primary Examiner*—Monroe H. Hayes
*Attorney, Agent, or Firm*—Peter K. Kontler

[57] ABSTRACT

A strip of exposed and developed film has a series of exposures and corresponding exposure identification numbers. The strip is conveyed through a scanning station on its way to a printing station. The exposures and identification numbers are scanned in the scanning station to produce output signals indicative of density changes. The signals are processed to generate groups of data which are combined into a data set. Each group includes the position of a respective exposure on the strip, the identification number for the exposure and the position of the identification number on the strip. Film transport is carried out in such a manner that scanning of the strip and processing of the resulting signals are completed before arrival of the strip at the printing station. A control unit uses the data set to position the exposures in the printing station and to print the exposures. The control unit also uses the data set to mark a copy of an exposure with the identification number of the exposure.

28 Claims, 3 Drawing Sheets

COPYING METHOD AND COPIER FOR FILM

BACKGROUND OF THE INVENTION

The invention relates generally to the treatment of masters or originals.

More particularly, the invention relates to the treatment of exposed and developed lengths of photosensitive material having a plurality of exposures. Each of the lengths further has a plurality of uncoded and/or coded exposure identification numbers imaged onto a longitudinal margin. The lengths are conveyed along a predetermined path and are sensed in a measuring station disposed along the path. Sensing of the lengths may, for example, be performed photoelectrically by illuminating the lengths via a scanning slit which extends normal to the path.

Films of small size currently in use have uncoded exposure identification numbers, and sometimes machine-readable, coded exposure identification numbers, imaged onto a longitudinal margin. By means of these numbers, a customer can identify the exposures to be copies, e.g., when ordering additional copied. To facilitate this, the German Auslegeschrift 11 85 472 describes a method in which the exposure identification numbers are read in a copier and then imprinted on the backs of the corresponding copies. The publication also discloses a simplified method for handling orders for additional copies. Here, the film is introduced into the copier and, at the same time, the exposure identification number of the exposure to be copied is inputted. The film is thereupon properly positioned in the copying station automatically and a paper copy produced.

Difficulties can arise both with the imprinting of the exposure identification number on the back of the copy and with the positioning of the film following entry of the exposure identification number. The reason is that the exposure identification number cannot always be clearly linked to the corresponding exposure.

To solve this problem, the European patent application 320 880 provides a sensor to detect the coded or uncoded exposure identification number. The publication proposes to measure the distance travelled by the number during film transport until the exposure is positioned in the copying station. The detected exposure identification number is associated with the exposure when the distance travelled lies within predetermined limits.

Problems can occur with this method also if, for instance, the distances between exposures are not equal to the distances between numbers; if individual exposure identification numbers are destroyed because of damage to the film; or if errors arise during reading of the exposure identification numbers.

SUMMARY OF THE INVENTION

It is an object of the invention to provide a method which makes it possible to increase the probability of marking a copy with the correct exposure identification number.

Another object of the invention is to provide a method which allows exposures to be more reliably positioned based on exposure identification numbers.

An additional object of the invention is to provide a method which enables the correct exposure identification number to be marked on the back of a paper copy with a high degree of reliability and allows highly reliable positioning of a length of photosensitive material, e.g., upon a reorder, based on inputted exposure identification numbers.

A further object of the invention is to provide an apparatus which makes it possible to increase the probability of marking a copy with the correct exposure identification number.

It is also an object of the invention to provide an apparatus which permits exposures to be more reliably positioned based on exposure identification numbers.

Still another object of the invention is to provide an apparatus which enables the correct exposure identification number to be marked on the back of a paper copy with a high degree of reliability and allows highly reliable positioning of a length of photosensitive material, e.g., upon a reorder, based on inputted exposure identification numbers.

The preceding objects, as well as others which will become apparent as the description proceeds, are achieved by the invention.

One aspect of the invention resides in a method of treating a length of exposed and developed photosensitive material, e.g., photographic film, having a plurality of exposures and exposure identification numbers. The exposure identification numbers may be uncoded and/or coded and may, for instance, be imaged onto a longitudinal margin of the length. The method comprises the steps of sensing the length to obtain a series of measurements for the exposures and exposure identification numbers; processing the measurements to derive first values each of which represents a respective exposure identification number and second values each of which represents the position of a respective exposure on the length; grouping each of the first values with a different second value to establish a data set; and performing an operation with the data set.

The sensing step may involve photoelectrically scanning the length. The length may be conveyed along a predetermined path during the sensing step, and the sensing step may include successively scanning strip-like portions of the length which extend transversely of the predetermined path or direction of transport. Such scanning may be performed by illuminating the length via a scanning slit which runs transverse to the predetermined path or direction of transport.

The processing step may additionally comprise deriving third values each of which represents the position of a respective number on the length. The grouping step then involves grouping each of the first values with a different second value and a different third value.

The processing step may further comprise deriving additional values each of which represents exposure data for a respective exposure. The grouping step here includes grouping each of the first values with a different second value, a different third value and a different additional value.

The performing step may include storing the data set and/or employing the set for a procedure. Thus, the performing step may comprise positioning an exposure in a copying station; making a copy of the exposure, e.g., on light-sensitive copy paper; and marking the copy with the corresponding exposure identification number. The identification number may be printed and this is preferably done on the back of the copy.

The method may additionally comprise the step of inputting selection data representing the identification number of a selected exposure to be copied. The performing step then involves comparing the data set and the selection data, and copying the selected exposure when the selection data is matched to data of the set.

The method may also comprise the step of inputting additional data representing the number of copies to be made of the selected exposure, and a corresponding number of copies is thereupon produced during copying.

The inputting steps may involve storing the selection data and the additional data, i.e., entering the selection data and the additional data in a memory.

The steps of inputting the selection data and additional data are particularly well-suited for the handling of reorders.

The sensing, processing, grouping, performing and inputting steps may be carried out for at least one additional, separate length of exposed and developed photosensitive material having a plurality of exposures and exposure identification numbers. The method may here further comprise the step of automatically feeding the various lengths in any desired order, and the sensing, processing, grouping, performing and inputting steps may then also be effected automatically. The inputting steps may involve automatically reading the selection data and the additional data. This may be accomplished in that a customer fills out a card with the selection data and additional data and that the card is then read by machine.

The grouping step may comprise forming a plurality of provisional groups each of which includes a first value and a provisional second value. The performing step then includes deducing from each group a proposed sequence of the exposures and exposure identification numbers along the length, comparing the sequences with one another, and selecting the most frequently occurring sequence as the true sequence. When third values which respectively represent the positions of the identification numbers on the length are derived, a third value corresponding to the respective first value may be assigned to each group.

If uncoded exposure identification numbers are present, a provisional second value may be assigned to a group when the center of the number represented by the first value of the group is adjacent to the exposure corresponding to the provisional second value.

In accordance with the invention, a substantial portion of the length of photosensitive material, or the entire length, is scanned or measured before the first copy is made. Thus, at the time that the first exposure is copied, several or all of the exposure identification numbers, as well as the positions of several or all numbers and exposures, are available. The availability of this large number of data allows a linkage between an exposure and its identification number to be established much more easily than if this were done for each exposure individually immediately following detection of the exposure and the corresponding identification number.

The linkage is preferably effected by provisionally assigning a detected identification number to each detected exposure. Since the distance between exposures, as well as the distance between identification numbers, is known, a proposed sequence for all exposures of the scanned portion of the photosensitive length, or of the entire length, may be derived by interpolation from the values obtained for any one exposure, i.e., from the value representing the position of the exposure, the value representing the provisionally assigned identification number, and the value representing the position of the number. An interpolated sequence is calculated from the values obtained for each exposure and these sequences are stored. The sequences, which are derived on the basis of provisional linkages between the different exposures and identification numbers, are used to establish the final linkages prior to making the first copy. This is accomplished by determining which sequence occurs most frequently and selecting such sequence as the final sequence. In the extreme, it is sufficient if only the last identification number of a photosensitive length is readable and can be associated with an exposure since even here an identification number can be linked to the first exposure by the time the latter is positioned in the copying station.

A provisional linkage is advantageously established by assigning to an exposure the identification number whose center is adjacent to the exposure, i.e., whose center lies between the ends of the exposure. If two identification numbers have centers adjacent an exposure and one of the identification numbers has a suffix, the number without the suffix is preferably assigned to the exposure.

An exposure identification number is imprinted on the back of a paper copy only after an identification number has been finally assigned to each exposure. It makes no difference whether this occurs shortly before or after the exposure procedure.

It is of advantage when the exposure data for an exposure is grouped with the values representing the position of the respective exposure, the exposure identification number and the position of the identification number.

The method of the invention is suited not only for the normal processing of orders for copies but also for the processing of reorders. For reorders, the identification numbers of the exposures to be copied, as well as the desired number of copies, are entered by an operator or automatically, e.g., by having a customer fill in these data on a card which is then read by machine. The photosensitive length is then scanned, and the linkages between the exposures and the identification numbers are thereupon established in accordance with the invention and stored. Each exposure of the photosensitive length is positioned in the copying station and the associated identification number is compared with the data entered by the operator or by machine. If an identification number finds a match in the entered data, the desired number of copies is retrieved from storage and the order executed appropriately.

According to the invention, several lengths of exposed and developed photosensitive material such as are obtained, for example, by cutting a film into sections may be placed in a feeding device by an operator in any desired order. Each length is now processed in the manner described above and is subsequently conveyed to a receiving device. Here, the manipulations required of the operator are limited to the placement of the lengths in the feeding device and either the manual entry of the reorder data or the handling of the data carrier to be used for automatic entry of the reorder data.

Another aspect of the invention resides in an apparatus for treating a length of exposed and developed photosensitive material, particularly photographic film, having a plurality of exposures and exposure identification numbers. The apparatus comprises first means for sensing the length to obtain a series of measurements for the exposures and numbers; and second means for (i)

processing the measurements to derive first values each of which represents a respective number and second values each of which represents the position of a respective exposure on the length, (ii) grouping each first value with a different second value to establish a data set, and (iii) performing an operation with the set.

The apparatus of the invention is particularly well-suited for carrying out the method according to the invention.

The apparatus may further comprise means for directing the photosensitive length along a predetermined path. The first means may be arranged to sense the length at a first location of the path and the second means may include means for copying the exposures at a second location of the path downstream of the first location using the data set. The first means, second means and directing means are here arranged and designed so that the data set is established before arrival of the leading exposure of the length at the second location.

According to one embodiment of the invention, the path has a segment which constitutes a temporary storage area for the photosensitive length. This makes it possible to delay the leading exposure in order to allow time for completion of the data set before the leading exposure arrives at the second location.

The second means may be designed to derive third values each of which represents the position of a respective exposure identification number on the length, and to group each first value with a different second value and a different third value.

The first means may include means for measuring the density of the photosensitive length and the second means then comprises means for determining the exposure identification numbers based on density measurements from the first means. The second means may additionally comprise means for establishing the position of the length, means for detecting the exposures, and means for calculating the second and third values and grouping each first value with a different second value and a different third value.

As mentioned previously, the exposure identification numbers may be imaged onto a longitudinal margin of the photosensitive length. Furthermore, a longitudinal margin of the length may be provided with perforations. The first means is here advantageously dimensioned to sense the length over the entire width thereof.

The first means may comprise a scanning slit which extends transversely of the path of travel, or direction of transport, of the photosensitive length, and a source of radiation on one side of the path in alignment with the slit. The density measuring means may then include a radiation-sensitive array on the opposite side of the path having first sensing cells for detecting density changes in the exposures, second sensing cells for detecting density changes in the region of the perforations, and third sensing cells for detecting density changes in the region of the exposure identification numbers. The means for determining the identification numbers and the means for establishing the position of the photosensitive length are coupled to the radiation-sensitive array. The second means may comprise additional means for calculating exposure data, and such additional means are likewise coupled to the radiation-sensitive array.

The apparatus may further comprise means upstream of the first means for accommodating a stack of photosensitive lengths to be copied, and means downstream of the copying means for stacking the lengths subsequent to copying. The means for directing the photosensitive length along a predetermined path here includes means for withdrawing the lengths from the accommodating means and conveying the lengths to the first means.

The novel features which are considered as characteristic of the invention are set forth in particular in the appended claims. The improved treatment method, as well as the construction and mode of operation of the improved treatment apparatus, will, however, be best understood upon perusal of the following detailed description of certain specific embodiments when read in conjunction with the accompanying drawings.

DESCRIPTION OF THE PREFERRED EMBODIMENTS

Figure 1:
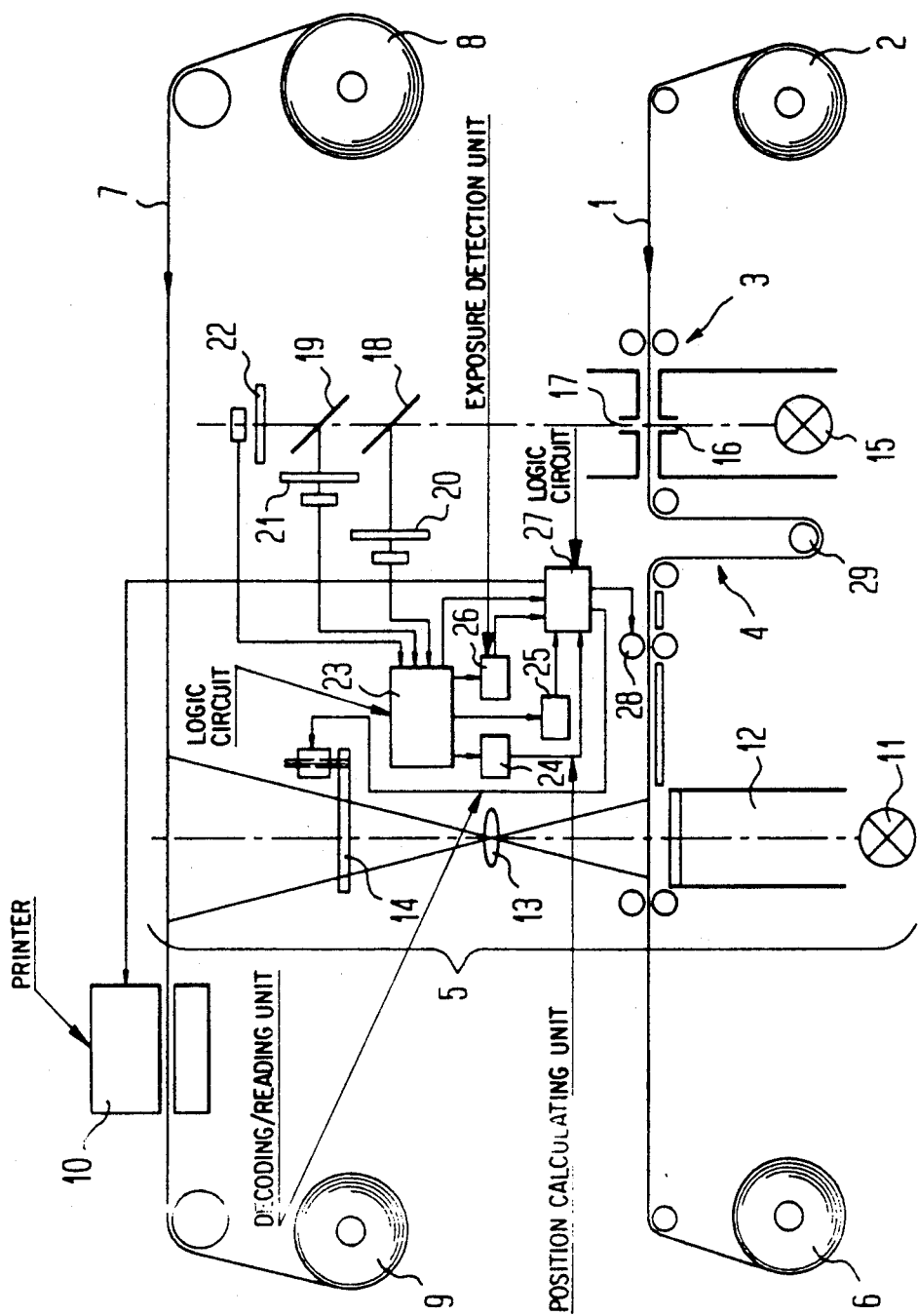
FIG. 1 schematically illustrates a roll copier in accordance with the invention for processing initial orders.

A roll copier intended for the processing of normal or initial orders for copies is shown in FIG. 1. It is assumed here that the copier is designed to handle photographic film. A series of exposed and developed, transparent photographic filmstrips, each of which may be considered to constitute a length of film or photosensitive material, are joined end-to-end so as to form a long band 1 which is coiled into a roll 2. The band 1 is conveyed and directed along a predetermined path by transporting rollers 28 and guiding rollers. The direction of transport is from right to left as seen in FIG. 1. The band 1 is unwound from the roll 2 and successively transported through a measuring or sensing station 3, an intermediate or temporary storage area 4 constituted by a segment of the path of travel of the band 1, and a copying or printing station 5. Downstream of the copying station 5, the band 1 is rewound into a roll 6.

A band 7 of copy material or paper is coiled into a roll 8. The band 7 is unwound from the roll 8 and successively transported through the copying station 5 and a printer 10. The band 7 is exposed in the copying station 5 and identifying data are printed on the back of the band 7 in the printer 10. Downstream of the printer 10, the band 7 is rewound into a roll 9.

The copying station 5 includes a light source 11, a light shaft 12, a lens system or imaging system 13 and a shutter 14. The light source 11 and light shaft 12 are disposed on that side of the path of the photographic band 1 which faces away from the band 7 of copy paper while the lens system 13 and shutter 14 are located on the opposite side of the path.

Figure 4:
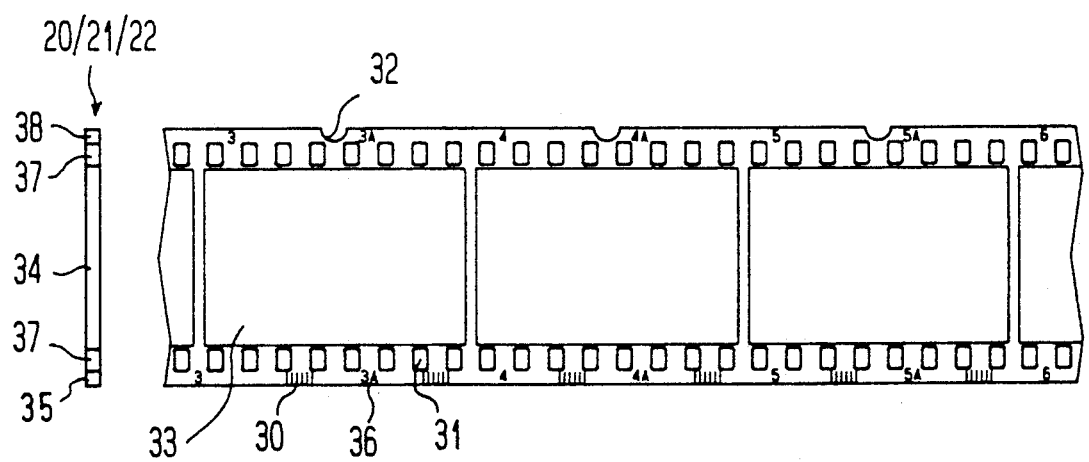
FIG. 4 illustrates a conventional, notched filmstrip of small size.

As shown in FIG. 4, each of the filmstrips of the band 1 includes a series of masters or originals in the form of exposures 33, e.g., in the form of negatives. Moreover, both longitudinal margins of a filmstrip are each formed with a row of perforations 31. In the illustrated embodiment, each longitudinal margin of a filmstrip is further provided with uncoded exposure identification numbers 36 while one longitudinal margin is additionally provided with coded exposure identification numbers 30.

The longitudinal margin opposite that with the coded exposure identification numbers 30 has a row of notches 32. Each of the notches 32 marks the midpoint between the longitudinal ends of a respective exposure 33.

The coded and uncoded exposure identification numbers 30 and 36 may be formed on the filmstrips by imaging.

The measuring station 3 includes a light source 15 which is in register with an illuminating slit 16 and an imaging slit 17. The slits 16 and 17 run perpendicular to the path, or direction of travel, of the photographic band 1 and extend across the entire width of the latter. The measuring station 3 also includes two color beam splitters 18 and 19 as well as three arrays 20, 21 and 22 of light-sensitive sensing or measuring cells having adequate resolution. The three arrays 20, 21 and 22 are respectively designed to measure the densities of the band 1 in the three primary colors blue, green and red. The light source 15 and illuminating slit 16 are situated on that side of the path of the band 1 which faces away from the band 7 of copy paper whereas the slit 17, beam splitters 18,19 and light-sensitive arrays 20,21,22 are disposed on the opposite side of the path.

The arrays 20,21,22 generate output signals which are evaluated in a logic circuit 23. One function of the logic circuit 23 is to calculate exposure data for the exposures of the filmstrips. The logic circuit 23 is connected to a decoding/reading unit 24 which can serve as a decoder for the coded numbers 30 and/or as a reader for the uncoded numbers 36. The logic circuit 23 is further connected to a calculating unit 25 which analyzes the signals originating from the perforations 31 and uses these signals to determine the instantaneous position of a filmstrip. The logic circuit 23 is also connected to an exposure detection unit 26 which can detect the notches 32.

The logic circuit 23, decoding/reading unit 24, calculating unit 25 and detection unit 26 are all connected to a second logic circuit 27 which receives the output signals of the circuit 23 and units 24,25,26. The logic circuit 27 controls the transporting rollers 28, shutter 14 and printer 10.

The individual filmstrips of the band 1 are normally connected to one another by adhesive strips which are opaque to the radiation from the light source 15 in the measuring station 3. This permits the beginning and end of each filmstrip to be readily detected. The light source 15 emits a measuring beam which travels through the illuminating slit 16 and illuminates a strip-like portion of the band 1 extending across the entire width of the latter. Since the band 1 moves along its path as it is illuminated by the measuring beam, successive strip-like portions of the band 1 are illuminated by the beam. The beam passes through the transparent band 1 and arrives at the chromatic reflectors 18,19 via the imaging slit 17. The chromatic reflectors 18,19 split the beam into its blue, green and red components. The resulting blue, green and red beams respectively impinge upon the arrays 20,21,22 which are sensitized to the corresponding colors. The arrays 20,21,22 generate output signals in response to impingement of the colored beams and these signals are transmitted to the logic circuit 23.

With reference again to FIG. 4, each of the measuring arrays 20,21,22 has a set of measuring cells 34 which are arranged to measure the densities of the exposures 33. The output signals of the measuring cells 34 are used to calculate exposure data for each of the exposures 33.

The exposure data calculated in this manner are sent to the logic circuit 23.

Each of the arrays 20,21,22 further has a set of measuring cells 35 which are arranged to detect the coded numbers 30 and/or the uncoded numbers 36 on the band 1. The output signals produced by the measuring cells 35 go to the decoding/reading unit 24. The decoding/reading unit 24 can be designed to convert the coded numbers 30 into corresponding, uncoded exposure identification numbers and/or to read the uncoded exposure identification numbers 36. The decoding/reading unit 24 sends the detected exposure identification numbers to the logic circuit 27.

Each of the measuring arrays 20,21,22 also includes sets of measuring cells 37 which are arranged to detect the perforations 31 of the band 1. The output signals from the measuring cells 37 are processed in the position calculating unit 25. In practice, the position calculating unit 25 can count the perforations 31 as the band 1 moves so that, for each step taken by the band 1, the corresponding positional coordinates are available. These positional coordinates are likewise forwarded to the logic circuit 27.

Each of the measuring arrays 20,21,22 additionally comprises a set of measuring cells 38 which are arranged to detect the notches 32 of the band 1. As mentioned previously, each of the notches 32 marks the midpoint between the longitudinal ends of a respective exposure 33. The output signals of the measuring cells 38, which respectively indicate detection of a notch 32, are transmitted to the exposure detection unit 26. The exposure detection unit 26, in turn, sends notch detection signals to the logic circuit 27.

Figure 5:
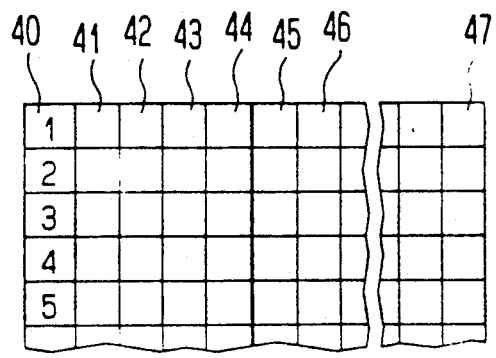
FIG. 5 schematically illustrates a data storage matrix.

For each individual exposure, it is now possible to calculate positional data for the leading and trailing ends of the exposure as well as the positions of the corresponding coded and uncoded exposure identification numbers. In addition to the exposure data already obtained, the decoded or uncoded identification number and two other values are thus available for each exposure. These other values are the position of the The exposure data, positional data and identification numbers for the exposures can, for example, be entered in a storage matrix such as shown in FIG. 5. The storage matrix has a series of columns 40,41,42,43,44,45,46 . . . n. The exposures detected by the exposure detection unit are assigned numbers sequentially and such numbers are entered in the column 40 in order. The exposure data are entered in the column 41. Although only a single column is provided here for the exposure data to simplify the illustration, the exposure data which are to be entered in the storage matrix actually include the duration of exposure and the color correction values. Column 42 contains the positions of the respective exposures. A single positional coordinate, e.g., that for the middle of an exposure or the beginning of an exposure, suffices to specify the position of the exposure because the dimensions of the exposures are known. The exposure identification numbers imaged onto the filmstrips are listed in the column 43. An uncoded exposure identification number is provisionally assigned to an exposure when the middle of the uncoded identification number lies within a range of 12 mm to the left or the right of the middle of the exposure. If two uncoded identification numbers, one with and one without a suffix, are located in this range, the identification number without the suffix is selected. Column 44 contains the positional coordinates of the uncoded identification numbers listed in column 43.

The data in columns 41 to 44 allow linkages between the exposure identification numbers and exposures of an entire filmstrip to be calculated or derived by interpolation. In other words, for each row of the storage matrix, the data in columns 41 to 44 make it possible to deduce a provisional or proposed the filmstrip. Beginning with the first row, the data in columns 41 to 44 are used to calculate the exposure identification number for the first detected exposure, the exposure identification number for the second detected exposure, and so on. The calculated exposure identification number for the first detected exposure is entered in column 45, the calculated exposure identification number for the second detected exposure is entered in column 46, and the calculated exposure identification number for the nth detected exposure is entered in column n. This procedure is repeated for each row so that an individual proposed or interpolation sequence is obtained for each exposure.

As outlined earlier, the photographic band 1 enters the storage area 4 after leaving the measuring station 3. The storage area 4 includes a roller 29 which causes a loop to be developed in the band 1. The roller 29 is movable up-and-down as seen in FIG. 1 so that the size of the storage area 4 can be varied in order to permit adjustment of the storage area 4 to the length of a particular filmstrip. The size of the storage area 4 is adjusted in such a manner that the leading exposure of a filmstrip is positioned in the copying station 5 only after the trailing exposure has passed through the measuring station 3. Accordingly, all of the data derived from the filmstrip is present in the logic circuit 27 at the time that the first copy is made from the filmstrip. When any exposure of the filmstrip is now positioned in the copying station 5, the logic circuit 27 can control the shutter 14, as well as a non-illustrated color filter arrangement, appropriately.

As indicated previously, each exposure is assigned a provisional exposure identification number. To obtain final linkages between the exposures and exposure identification numbers of a filmstrip, the interpolation sequences stored in the respective rows of the storage matrix in columns 45,46 . . . n are compared with one another. By way of example, if the code for the third exposure of the filmstrip was read incorrectly, the corresponding interpolation sequence will be incorrect. As another example, if the margin of the filmstrip is damaged in the region of the second exposure so that the code cannot be read at all, then no interpolation sequence will be present in the columns 45,46 . . . n of the row corresponding to the second exposure.

The storage matrix is evaluated very simply by determining only the frequency with which an interpolation sequence appears. The interpolation sequence which appears most often is selected as the final sequence. The final sequence obtained in this manner is one where reading errors and film damage have no effect. In the extreme, it is sufficient if only a single code can be read correctly and the associated exposure can be detected.

The printer 10 is regulated by the logic circuit 27 on the basis of the final sequence. After a paper copy leaves the copying station 5, the printer 10 prints the corresponding exposure identification number on the back of the copy.

Figure 2:
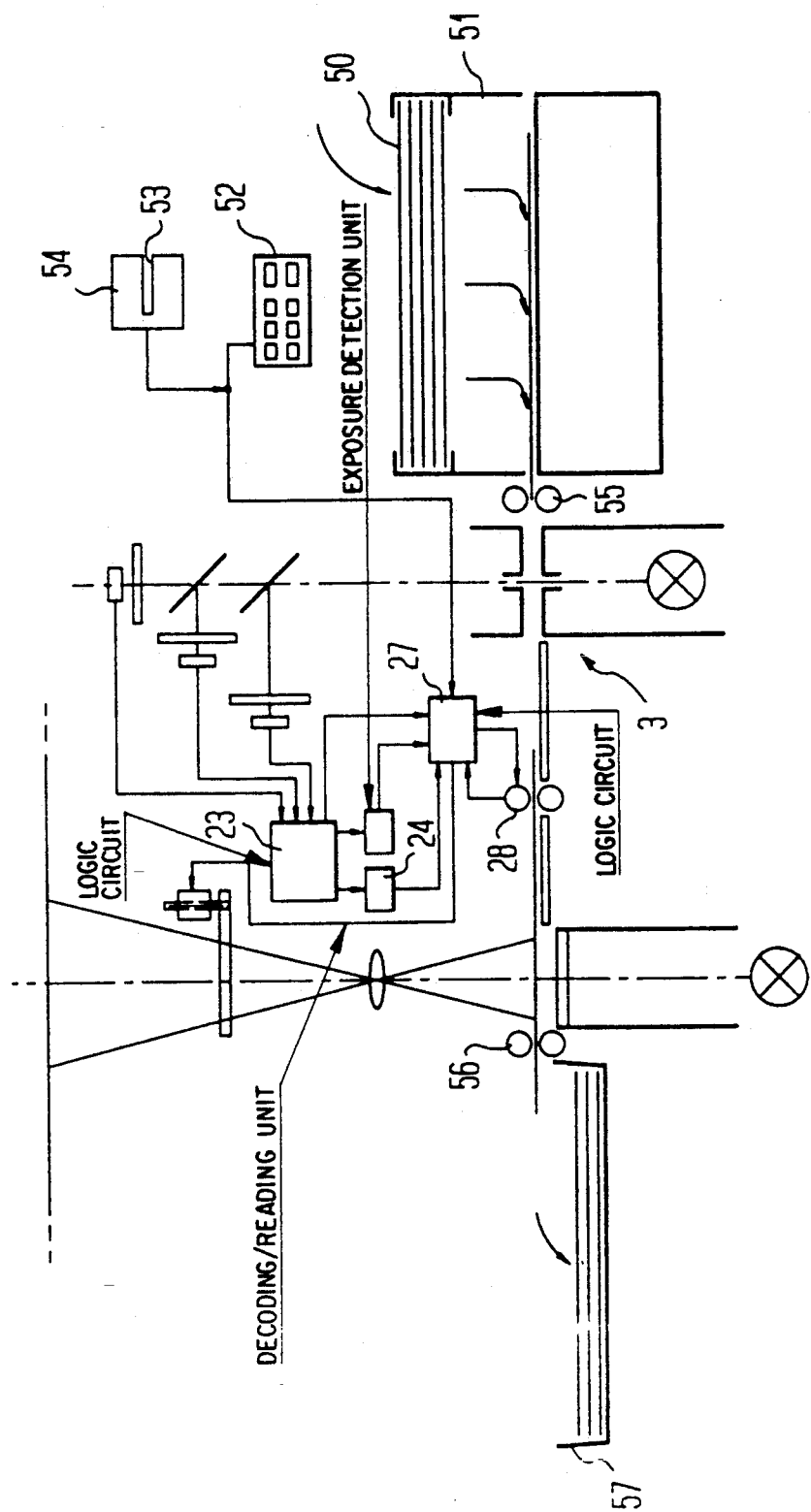
FIG. 2 schematically illustrates a copier according to the invention for processing reorders.

FIG. 2 illustrates a copier which is specially designed to process reorders. In FIG. 2, the same reference numerals as in FIG. 1 are used to identify similar elements and the following description of FIG. 2 will, for the most part, be restricted to the differences from FIG. 1.

Figure 3:
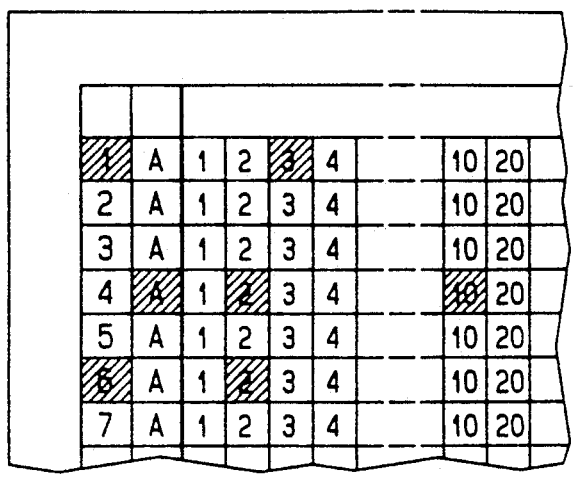
FIG. 3 illustrates a machine-readable reordering card to be completed by a customer.

A filmstrip in a reorder normally is no longer of one piece but, instead, has been cut into sections 50 having five or six exposures each. An operator places the sections 50 into a film holder 51. Generally, the envelope for the reorder or an accompanying label has been marked by the customer to indicate which exposures are to be copied and how many copies are to be made of each exposure. This information can be entered in the copier by the operator via an operator's console 52. Another manner of entering the information in the copier is by means of a machine-readable order card such as shown, for example, in FIG. 3. The illustrated card indicates that the customer wishes to have three copies of exposure number 1, twelve copies of exposure number 4a and two copies of exposure number 6. This card can be introduced directly into the slot 53 of a reader 54 by the operator. The card is thereupon read and the information stored.

The film sections 50 are automatically separated in the film holder 51 and conveyed to the measuring station 3 by means of transporting rollers 55. The operation of the measuring station 3 is identical to that described in connection with FIG. 1. Similarly, calculation of the exposure data in the logic circuit 23 and determination of the uncoded and/or coded exposure identification numbers in the decoding/reading unit 24 are carried out in the manner described previously. However, the film of a reorder is not always notched. For unnotched film, the individual exposures must be localized in the exposure detection unit 26 using density differences. A procedure of this type is disclosed, for example, in the German patent 27 05 097.

For reorders, it may be necessary to process unperforated film. In such an event, the positional coordinates for the exposures and exposure identification numbers must be determined in a manner different from that outlined above. To this end, the logic circuit 27 of FIG. 2 samples the rotational speed of the transporting rolls 28. For a high degree of precision, the logic circuit 27 must also sample the rotational speed of the transporting rollers 55. However, this has not been illustrated in order to preserve clarity.

The individual exposures are now linked to the exposure identification numbers as described with reference to FIG. 1. This is carried out for each film section 50 separately. The exposure identification numbers detected in the measuring station 3 are compared in the logic circuit 27 with the data entered via the console 52 or the reader 54. When one of the detected exposure identification numbers finds a match in the entered data, the corresponding exposure is positioned in the copying station and the exposure process is initiated. After processing of a film section 50 has been completed, the film section 50 is withdrawn from the copying station by transporting rollers 56 and deposited in a receiving tray 57. When the copier has finished processing an entire reorder, the operator can place the next stack of film sections in the film holder 51 and enter the corresponding reordering information.

In the copier of FIG. 2, the film sections 50 are handled automatically once they have been deposited in the film holder 51. If desired, data entry can also be performed automatically by means of the reader 54. The copier of FIG. 2 thus allows the manual operations required for reorders to be reduced to a minimum.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the instant contribution to the art and, therefore, such adaptations should and are intended to be comprehended within the meaning and range of equivalence of the appended claims.

What is claimed is:

1. A method of treating a length of exposed and developed photosensitive material having a plurality of exposures and exposure identification numbers, said method comprising the steps of sensing said length to obtain a series of measurements for said exposures and said numbers; processing said measurements to derive first values each of which represents a respective number and second values each of which represents the position of a respective exposure on said length; forming a data set having a plurality of data groups each of which includes a first value and a second value; and assigning a final, unique second value to each of said first values following completion of said set, the assigning step being performed using said set.

2. A method of claim 1, further comprising the step of storing said set.

3. The method of claim 1, wherein the processing step comprises evaluating all of said measurements as a group.

4. The method of claim 1, wherein the processing step comprises deriving third values each of which represents the position of a respective number on said length, and the grouping step comprises forming each of said first values with a unique second value and a unique third value.

5. The method of claim 1, wherein said numbers are uncoded.

6. The method of claim 1, wherein said numbers are coded.

7. The method of claim 1, wherein said length comprises photographic film.

8. The method of claim 1, wherein the sensing step comprises photoelectrically scanning said length.

9. The method of claim 1, further comprising the step of conveying said length along a predetermined path during the sensing step; and wherein the sensing step comprises successively scanning strip-like portions of said length which extend transversely of said path.

10. The method of claim 1, further comprising the steps of making a copy of at least one of said exposures, and marking said copy with the exposure identification number of said one exposure.

11. The method of claim 1, wherein the processing step comprises deriving additional values each of which represents exposure data for a respective exposure, and the forming step comprises grouping each of said first values with a second value and an additional value.

12. The method of claim 1, further comprising the steps of inputting selection data representing the exposure identification number of a selected exposure to be copied, comparing said selection data with the data groups containing said final second values, and copying said selected exposure when said selection data is matched to data of one such group.

13. The method of claim 12, further comprising the steps of inputting additional data representing the number of copies to be made of said selected exposure, said copying including making such number of copies.

14. The method of claim 13, wherein the inputting steps comprise storing said selection data and said additional data.

15. The method of claim 13, wherein the sensing, processing, forming assigning and inputting steps are carried out for at least one additional, separate length of exposed and developed photosensitive material having a plurality of exposures and exposure identification numbers; and further comprising the step of automatically feeding said lengths, the sensing, processing, forming assigning and inputting steps also being effected automatically.

16. The method of claim 15, wherein the inputting steps comprise automatically reading said selection data and said additional data.

17. The method of claim 1, wherein the forming step comprises forming a plurality of provisional groups each of which includes a first value and a provisional second value, and deducing from each group a proposed sequence of said exposures and numbers along said length, the assigning step including comparing said sequences with one another, and selecting the most frequently occurring sequence as the true sequence.

18. The method of claim 17, wherein the processing step comprises deriving third values each of which represents the position of a respective number on said length, and the forming step includes assigning to each group a third value corresponding to the respective first value.

19. The method of claim 18, wherein said numbers are uncoded and the forming step comprises assigning a provisional second value to each group when the center of the number represented by the first value of the group is adjacent to the exposure corresponding to the provisional second value.

20. The method of claim 1, wherein the forming step is carried out following completion of the sensing step.

21. An apparatus for treating a length of exposed and developed photosensitive material, particularly photographic film, having a plurality of exposures and exposure identification numbers, said apparatus comprising first means for sensing the length to obtain a series of measurements for the exposures and numbers; and second means for (i) processing the measurements to derive first values each of which represents a respective number and second values each of which represents the position of a respective exposure on the length, (ii) forming a data set having a plurality of data groups each of which includes a first value and a second value, and (iii) assigning, following completion of the data set, a final, unique second value to each first value using the data set.

22. The apparatus of claim 21, further comprising means for directing the length along a predetermined path, and means for copying the exposures at a selected location of said path using the data groups containing the final second values, said first means, second means and directing means being arranged and designed so that such data groups are established before arrival of the leading exposure of the length at said selected location.

23. The apparatus of claim 22, wherein said path has a segment which constitutes a temporary storage area for the length.

24. The apparatus of claim 21, wherein said second means is designed to derive third values each of which represents the position of a respective number on the length, and to form the data set by grouping each first value with a second value and a third value.

25. The apparatus of claim 24, wherein said first means includes means for measuring the density of the length, said second means comprising means for determining the numbers based on density measurements from said first means, means for establishing the position of the length, means for detecting the exposures, and means for calculating the second and third values and grouping each first value with a second value and a third value.

26. The apparatus of claim 25 for use with a length of photosensitive material having the numbers marked on at least one longitudinal margin, wherein said first means is dimensioned to sense the length over the entire width thereof.

27. The apparatus of claim 26 for use with a transparent length of photosensitive material having perforations along at least one longitudinal margin, further comprising means for directing the length along a predetermined path; and wherein said first means comprises a scanning slit and a source of radiation on one side of said path in alignment with said slit, said slit extending transversely of said path, and said density measuring means including a radiation-sensitive array on the opposite side of said path having first sensing cells for detecting density changes in the exposures, second sensing cells for detecting density changes in the region of the perforations, and third sensing cells for detecting density changes in the region of the numbers, said determining means and said establishing means being coupled to said array, and said second means comprising additional means for calculating exposure data coupled to said array.

28. The apparatus of claim 21, further comprising means for copying the exposures, means for directing the length along a predetermined path, means upstream of said first means for accommodating a stack of lengths to be copied, and means for stacking the lengths subsequent to copying, said copying means being disposed downstream of said first means, and said stacking means being disposed downstream of said copying means, said directing means including means for withdrawing the lengths from said accommodating means and conveying the lengths to said first means.

* * * * *